United States Patent [19]
Virnig

[11] 3,830,387
[45] Aug. 20, 1974

[54] VEHICLE WHEEL HANDLING APPARATUS
[76] Inventor: Sep Jacob Virnig, 620 N. 8th St., Medford, Wis. 54451
[22] Filed: Mar. 15, 1973
[21] Appl. No.: 341,697

[52] U.S. Cl.................... 214/331, 29/273, 214/333
[51] Int. Cl............................................. B60b 29/00
[58] Field of Search............ 254/2 R, 133; 214/330, 214/331, 332, 333, 334; 29/273; 105/215

[56] References Cited
UNITED STATES PATENTS

| | | | |
|---|---|---|---|
| 1,248,896 | 12/1917 | Olson | 214/332 |
| 1,305,322 | 6/1919 | Towler | 29/273 |
| 1,964,119 | 6/1934 | Hendry | 214/331 |
| 2,362,981 | 11/1944 | Baum | 214/332 |
| 2,388,692 | 11/1945 | House | 214/333 |
| 2,393,602 | 1/1946 | Baum | 214/332 |
| 2,444,992 | 7/1948 | Kittel | 214/331 |
| 2,903,049 | 9/1959 | Carlson | 214/331 |
| 3,501,037 | 3/1970 | Donovan | 214/331 |

Primary Examiner—Robert G. Sheridan
Assistant Examiner—Lawrence J. Oresky
Attorney, Agent, or Firm—Williamson, Bains & Moore

[57] ABSTRACT

A vehicle wheel handling apparatus for holding and manipulating heavy vehicle wheels of single or tandem nature, comprises a frame including an upright post with a slidably mounted carriage thereon having wheel engaging means such as a pair of arms swingably mounted relative to one another, each arm having a pivotally mounted wheel engaging member adjacent the end thereof. Means are provided for tightening the wheel engaging means on single or tandem vehicle wheels to retain the wheels. A wheel removing mechanism is provided to urge hard to remove wheels from the vehicle. The apparatus permits single or tandem vehicle wheels to be lifted from the vehicle axle, moved about, retained during servicing, or pivoted about a horizontal axis by an operator.

10 Claims, 5 Drawing Figures

PATENTED AUG 20 1974
3,830,387
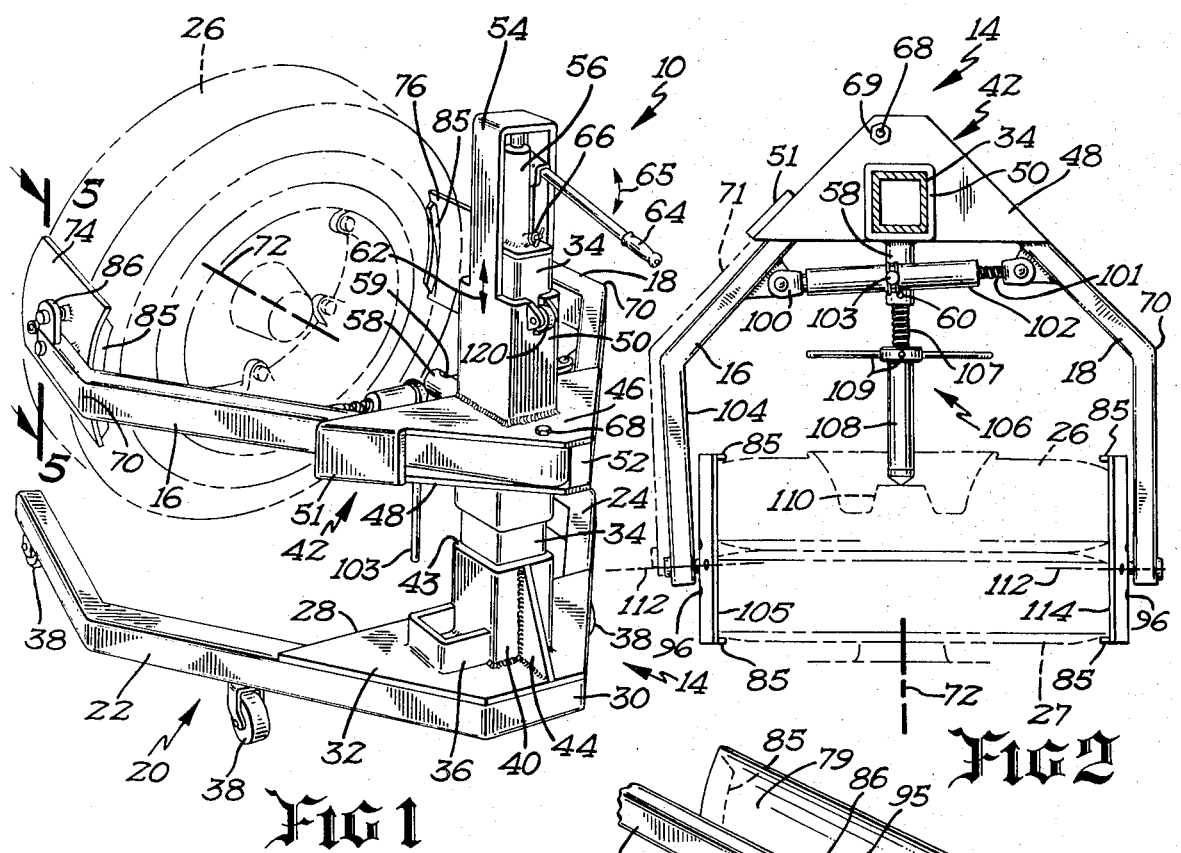
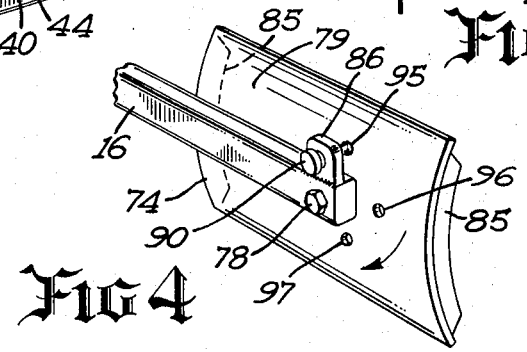
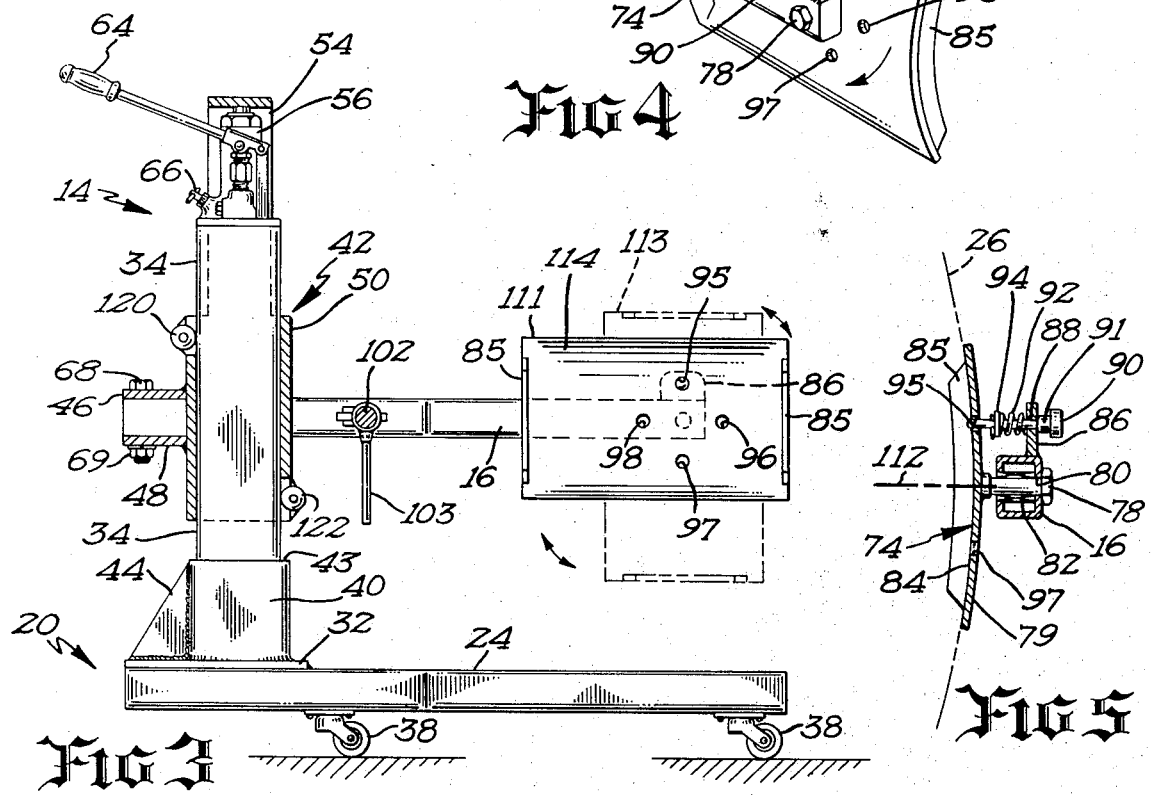

VEHICLE WHEEL HANDLING APPARATUS

BACKGROUND OF THE INVENTION

Heavy vehicles such as trucks, tractors, heavy construction equipment and the like utilize large, heavy tandem or single wheels which are difficult to handle and service. All such vehicles require regular periodic servicing during which these large wheels are removed to facilitate such repairs as brake work, bearing lubrication and the like. The rigorous maintenance demands of interstate truck fleets require continual maintenance operations wherein the heavy tandem wheels, weighing several hundred pounds per pair, are serviced by labor gangs which manually remove the lugs, lift off the wheels, inspect and service the equipment and then laboriously lift the wheels back into position and secure them. Often additional movement or manipulation of the tandem wheels is required to complete essential repair work on the hub or rim. The manual servicing of heavy vehicle wheels, whether for trucks, tractors, heavy construction equipment or other heavy vehicles, has required considerable physical exertion and the heavy single or tandem wheels represent a substantial safety hazard while being lifted or manipulated by the labor gangs. For example, it is sometimes extremely difficult to remove oversize or tandem wheels from vehicles when the hub or rim adheres tenaciously to the axle due to rusting or the like. The physical effort required to force them from the axle combined with the heavy weight of the wheels can easily result in accident and injury. Accordingly, it is desirable to provide an apparatus easily operated by one man to eliminate the safety hazards associated with such work and reduce the burden of handling and manipulating such wheels. Such an apparatus would substantially reduce the number of man hours and cost associated with proper vehicle maintenance.

BRIEF SUMMARY OF THE INVENTION

The invention relates to the field of wheeled vehicle repair tools and equipment and comprises an apparatus for handling and manipulating the heavy wheels, either single or tandem, of trucks, tractors, farm vehicles, heavy construction equipment and the like.

The wheel handling apparatus utilizes a heavy duty frame supported on casters so as to be movable toward and away from a wheel of a truck or other heavy vehicle and easily controlled by a single operator. The frame has a bifurcated base with the bifurcations serving as widely spaced legs positioned along the vehicle wheel path force and aft of the vehicle wheel, while the apex of the bifurcated base confronts the wheel hub; the wheel is thus effectively confined by the configuration of the base and prevented from rolling into or falling on the operator.

The frame includes a generally upright post rigidly affixed to the base, and a carriage slidably mounted on the post. A power unit mounted between carriage and post permits an operator to easily raise and lower the carriage along the post. A pair of arms is carried by the carriage and swingably mounted relative to each other for movement toward and away from the periphery of the vehicle wheel to be handled by the apparatus. At the end of each of the arms is a wheel engaging member or jaw which is shaped to securely grip the periphery of the wheel to hold and retain the wheel during servicing. Because some wheels are difficult to remove from the vehicle axle due to rusting, a wheel removing mechanism is provided to mechanically force the wheel from the vehicle, thereby avoiding the need for the operator using his physical strength. The wheel engaging jaws are pivotally mounted to the arms, permitting an operator to rotate the wheel or wheels about a horizontal axis to provide easy access to the wheel and hub for servicing. Means are provided to lock the jaws in a plurality of convenient wheel servicing positions.

Opposite ends of each jaw are provided with wheel confining barriers arranged to lie on either side of the wheel tread to prevent the wheel slipping from the jaws during holding or pivoting of the wheel. The jaws are arcuately shaped to conform to the circular periphery of the wheel. The invention, which can be operated by a single man, reduces the need for multi-man teams to perform wheel servicing functions and frees men from other activity. The apparatus makes it possible to complete the wheel removing or replacing operation substantially faster and with less effort than the methods now in use. It greatly reduces the danger and work associated with lifting heavy or cumbersome tires and the likelihood of such tires falling on an operator. In addition, the apparatus provides a convenient work platform for holding the wheel during servicing and a convenient dolly-substitute for transporting the wheel. The invention can be used for the handling of either single or tandem wheels, and can be made in various sizes to accommodate wheels of larger or smaller diameter. The apparatus is extremely sturdy, long lasting, efficient, reliable and inexpensive to manufacture.

BRIEF DESCRIPTION OF THE DRAWINGS

FIG. 1 is a perspective view of the wheel handling apparatus shown with a wheel retained thereby.

FIG. 2 is a bottom sectional view of the carriage and arms of the apparatus of FIG. 1 taken through the upright post and showing the apparatus retaining a pair of tandem wheels being removed from an axle by a wheel removing device.

FIG. 3 is a side elevation view, partly in section of the apparatus of FIG. 1 and showing the pivotally mounted jaws in alternative positions.

FIG. 4 is a perspective view of a pivotally mounted jaw used with the invention.

FIG. 5 is a cross-sectional view of the jaw and wheel taken along cutting plane 5—5 of FIG. 1.

DETAILED DESCRIPTION

Referring now to FIG. 1, the vehicle wheel handling apparatus 10 has a sturdy, rigid frame 14 to which arms 16 and 18 are mounted, the arms being swingable relative to one another.

The frame 14 has a bifurcated base 20, the bifurcations or legs 22 and 24 being widely spaced from one another to permit their being positioned along the vehicle wheel path fore and aft of a wheel 26 to be removed from the axle of a vehicle. The low center of gravity of the base 20 makes it extremely stable and the bifurcated shape confines the wheel 26 between the legs 22 and 24 and the apex area 28 of the base. The barrier or fence like enclosure defined by the bifurcated base 20 confines the wheel 26 therein and prevents its rolling or bouncing about, preventing injuries to an operator in the event the wheel should inadvertently slip from the wheel engaging means which will be described further hereafter. The legs 22 and 24 are formed of steel box channel or like material and welded to an interconnecting member 30 at the apex. A platform 32 formed of sheet steel provides reinforcement for the legs and a convenient surface on which the upright post 34 of the frame is rigidly mounted by welding or other means known to the art. A compartment 36 is provided on the platform 32 to contain small parts such as lug bolts during the wheel removing operation.

To make the frame 14 readily movable on a garage floor or like working surface, swingable castors 38 are positioned at four locations on the base. Two castors 38 are positioned on leg 22, one being adjacent the end of the leg and the other near the platform 32. The two castors associated with leg 24 are positioned in substantially identical locations on leg 24.

A stop 40 is positioned on the post 34 to prevent movement of the carriage 42 below the edge 43 of the stop 40. A gusset 44, welded between the stop 40 and platform 32, provides additional support to the post 34. The upright post 34 is provided with smooth peripheral sides to readily permit sliding movement between post 34 and carriage 42.

The frame 14 includes carriage 42 which is slidably mounted on post 34 for movement in directions 62. Rollers 120 and 122 are installed on the carriage 42 at upper and lower ends thereof, the roller 120 being on the rear side of the carriage and the roller 122 being on the forward side of the carriage. The rollers are so positioned to assure smooth, even sliding of the carriage when a heavy load is applied to the arms. The load is applied most heavily at the positions of these rollers, and they substantially reduce the friction which would otherwise result from such loading. Accordingly, it is desirable to utilize the rollers 120 and 122 in substantially the shown positions. It should be understood that while a particular carriage has been shown which utilizes the already described highly desirable rollers, the invention is operable without the rollers 120 and 122 and a slidably mounted carriage without rollers is also within the purview of the invention. The carriage has a pair of generally horizontal, parallel wings 46 and 48 attached to the slide 50 of the carriage and interconnected by support members 51 and 52. The carriage also includes a power unit mounting bracket 54 extending upward from a slide 50 and comprising a rectangular enclosure within which a power unit such as hydraulic cylinder 56 is mounted. The carriage has a socket 58 having a bore 59, through which a pin may be inserted to retain the stem 60 of a wheel removing mechanism 106 which will be described hereafter. The carriage 42 is made of rigid steel and may be welded or assembled and retained in any manner known to the art. Although a particular configuration has been shown for the carriage 42, it should be understood that other equivalent structural variations which may be used are within purview of the invention.

A pair of identically shaped arms 18 and 20 is carried by the carriage 42 and is swingably mounted relative to one another. The fixed arm 18 is rigidly attached between the wings 46 and 48 of the carriage by welding, bolting or any other appropriate means known to the art. The floating arm 16 is pivotally mounted between the wings by means of bolt 68 passed therethrough and secured by a nut 69. The support member 51 limits the outward swing of the floating arm 16 which is movable from a disengaged position 71 (FIG. 2) to an engaged position 104 where the wheel gripping jaws 74 and 76 (FIG. 1) engage the wheel. Each of the arms 16 and 18 diverge outwardly from the carriage 42 toward the periphery of the wheel to provide adequate spacing between the arms to permit wheel 26 to be rotated about a horizontal axis 112. The arms 16 and 18 are formed of steel box channel material although other materials can be used if desired. Although the embodiment shown herein has one arm fixed and the other movable, it should be understood that both arms could be pivotally mounted if desired.

At the end of each of the arms 16 and 18 a vehicle wheel engaging member or jaw 74 and 76, respectively, is pivotally mounted to the arm. The jaws 74 and 76 are identical and are arcuate in cross section as shown in FIG. 5, with a shaft 78 extending outwardly from the rear surface 79. The shaft 78 passes through roller bearing 82 in bearing aperture 80 of the arm 16 or 18. The roller bearing 82 in each bearing aperture 80 assures smooth rotation of the shaft 78 therein.

The shaft 78 is not positioned at the center of the jaws 74 or 76, but rather is positioned in an off-center position so as to more readily permit the wheel or wheels of a vehicle to be balanced about the horizontal axis 112 when gripped by the jaws. This positioning is desirable because the center of gravity of a vehicle wheel is not at its geometric center since the heavy hub or rim offsets this center of gravity toward one face of the vehicle wheel.

The arcuate cross section of the jaws 74 and 76 permits the wheel engaging surface 84 to closely and securely engage the wheel 26. The radius of curvature of the arcuate cross section should preferably be equal to or less than the anticipated radius of curvature of the wheel for best retention of the wheel. A confining barrier 85 is positioned at opposite ends of the jaw on the wheel engaging surface 84 and may be attached by welding or formed as an integral part of the jaw by stamping or the like, the purpose of the barrier being to lie on either side of the wheel or wheels to contain the wheel or wheels and prevent slipping of the wheels from the jaw when the wheels and jaws are rotated about the horizontal axis 112.

Locking means are provided to retain the wheel engaging members or jaws 74 and 76 in a predetermined position relative to the arms 16 and 18. The locking means comprises an ear 86 mounted on the arm 16 (FIGS. 3–5). The ear has a bore 88 therethrough to receive a locking pin 90. The pin 90 is provided with a shoulder 91 which is retained in contact with the ear 86 by means of a spring 92 contained between the ear 86 and a removable pin 94. Accordingly, when the pin 90 is pulled outwardly from the ear 86 the spring 92 urges it inwardly again.

The rear surface 79 of the jaw is provided with a plurality of sockets, bores or the like at regularly spaced intervals arranged to engage the pin 90 to retain the jaw in one or more predetermined positions.

Referring now to FIG. 3, four such spaced sockets are shown at ninety degree intervals, namely sockets 95, 96, 97 and 98. Accordingly, the spring loaded pin 94, the ear 86 and one or more of the shown sockets collectively form a locking means for retaining the wheel engaging member or jaw 74 in a predetermined position and preventing undesirable rotation of the jaw. At least one of the jaws should be provided with the described locking means, and, if desired, both jaws may be so equipped.

If desired, a universal mounting may be installed between the jaws 74 or 76 and the shaft 78 to permit the jaw to more readily shift its position to conform to the periphery of the wheel as the jaws tighten on the wheel. The universal mounting is particularly helpful if a variety of wheel diameters is to be handled by the apparatus.

Referring now to FIG. 1, the jaw 74 is constructed to contain a single wheel 26, the distance between barriers 85 at opposite ends of the jaw being chosen to be compatible with the width of the wheel 26. It should be understood that the length of the jaw and accordingly the distance between barriers 85 on the jaw can be increased to accommodate a pair of tandem wheels 26 and 27 like those shown in FIG. 2, where the length of each jaw 105 and 114 is greater than the jaws 74 and 76 so as to accommodate and contain the tandem wheels. The larger jaws of FIG. 2 could be used to contain a single wheel rather than the tandem wheels if desired. The mounting and design of the larger jaws 105 and 114 aside from their size are identical to the jaws 74 and 76.

Accordingly, the arms 16 and 18 and the described vehicle wheel gripping members or jaws constitute vehicle wheel engaging means to engage a wheel or pair of wheels securely to permit handling and manipulating of the wheels during servicing.

A means for tightening the jaws against the wheel or wheels is provided in the form of a pair of threaded rods 100 and 101, one having a right hand thread and the other a left hand thread. A reversible ratchet device 102 with operating handle 103 is manually actuated by an operator to pull the arms 16 and 18 toward or away from one another to securely grip or release, respectively, the wheel or wheels. The threaded rods 100 and 101 are pivotally mounted between the arms 16 and 18, respectively, to permit tightening means to pivot when the floating arm 16 as it swings from an engaged position 104 to a release position 71. Although a particular structure for tightening and releasing the wheel engaging means has been shown, it should be understood that other equivalent tightening means known to the art are within the purview of the invention.

At times the heavy wheels which the apparatus 10 is designed to remove will be found rusted to the axle section of the vehicle and must be forcibly removed. To facilitate removal, a wheel removing mechanism 106 has its stem removably inserted within the socket 58 of carriage 42 and selectively retained therein by a pin through bore 59, the mechanism 106 having a heavy duty screw 107 carrying a threaded ram 108. By rotation of handles 109 by the operator, the threaded ram is advanced along the screw 107 toward axle 110. By positioning the tip of the ram 108 against the end of axle 110, the wheel or wheels can be forcibly removed. The barriers 85 associated with the jaws grip the sides of the wheels and carry them outwardly from the truck body while advancing ram 108 pushes the apparatus 10 away from the vehicle.

In operation, when an operator wishes to remove a wheel or wheels from a vehicle, he first rolls the apparatus 10 to the wheel on the castors 38. The operator manually actuates the ratchet handle 103 causing the ratchet to urge the threaded rods 100 and 101 outwardly to swing the floating arm 16 to the disengaging or release position 71 to permit the spacing between jaws 74 and 76 or alternatively jaws 105 and 114 to be adequate to accommodate the wheel.

The operator then rolls the apparatus 10 up to the wheel, positioning the legs 22 and 24 on either side of the wheel causing the wheel to be closely confined between the bifurcated legs and apex 28 of the base 20. As the legs 22 and 24 are positioned on the sides of the wheel 26, as shown in FIG. 1, the jaws 74 and 76 are also positioned on opposite sides of the wheel at the widest portion of the wheel, the operator making certain that the barriers 85 of each jaw lie on both sides of the tread portion of the wheel. Depending upon the height of the tire, the operator may also desire to raise or lower the carriage 42 on the post 34 to position the jaws at the widest part of the tire. To raise the carriage 42, the operator pumps the handle 64 of power unit 56 in the directions of arrow 65, resulting in the hydraulic cylinder 56 extending and raising the slide 50 upwardly, the amount of elevation being dependent upon the extent of pumping of handle 64 by the operator. When the jaws are at the preferred elevation, the operator tightens the ratchet 102 causing the floating arm 16 to move toward the wheels, carrying the jaw 74 or 105 into engaging position 104 on the periphery of the wheel, the tightening of the ratchet being continued until the wheel is securely gripped by the jaws 74 and 76, or alternatively 100 and 114. The arcuate cross section of the each jaw shown in FIG. 5 closely engages the periphery of the wheel minimizing the likelihood of the wheel escaping the jaws. The barriers 85 located on either side of the tread of the wheel prevent the wheel from moving in directions parallel to its own axis 72 and thereby slipping from the jaws.

The legs 22 and 24 of the apparatus 10 cooperate with the arms 16 and 18, respectively, which overhang the legs, resulting in each paired arm and leg forming a fence like enclosure to contain the wheel 26 on either side of the wheel. For example, arm 16 and leg 22 provide a two tiered fence which very effectively prevents a heavy, potentially dangerous wheel from rolling, bouncing or sliding into an operator in the event the wheel, for any reason, escapes from the wheel engaging means.

Once the wheel has been securely gripped between the jaws, the operator removes the lug bolts from the hub or rim, placing them for convenient storage in container 36 on the base 20 of the apparatus. If the wheel is not rusted to the axle section 110 of the vehicle, the operator need only pull the apparatus 10 rearwardly from the vehicle, carrying the wheel along with the apparatus. In the event the wheel hub or rim is rusted to the axle section, the operator then inserts the stem of wheel removing mechanism 106 into the socket 58, securing the stem within the socket by means of a pin dropped through bore 59 of the socket 58 and through a bore in the stem which is in registering relation with the bore 59. The operator then butts the tip of the ram 108 against the axle 110 and begins rotating the handles 109 to advance the ram along the screw 107. The ram is advanced in this manner until sufficient pressure is brought to bear on the axle to force the wheel or wheels from the axle.

The jaws of the apparatus 10 securely grip the wheel or wheels and prevent rotation of the wheel or wheels about the wheel axis 72. Thus the stud holes of the wheel rims remain in the same orientation relative to the axle section, assuring that the wheel will fit easily on to the axle when it is reinstalled. No rotational misalignment of the wheel can occur since rotation of the wheel about its own axis 72 is prevented. Since the carriage 42 will retain the wheel at the same height at which it was situated when removed from the axle, the apparatus effectively keeps the wheel in perfect orientation for replacement on the axle, thus avoiding the difficult and time consuming problem of aligning the stud holes of the wheel with the axle section.

Once the wheel is removed from the vehicle, the operator can roll the apparatus 10 away from the vehicle by means of its easily rolling castors 38 to a convenient work area. If it is desirable to perform maintenance operations on the hub or rim of the wheel, such as certain brake repair, the operator may wish to rotate the wheel about axis 112. If so, the operator first removes the wheel removing mechanism from socket 58 and then pulls pin 90 outwardly from the ear 86 associated with arm 16, removing it from the socket 95 of the jaw 74 or 105. The jaw is now free to rotate about its shaft 78 which is pivotally mounted in roller bearing 82, permitting the jaw and wheel to be rotated over a desired angular interval such as 90° from, for example, position 111 to position 113 (FIG. 3), to permit the operator to work on the wheel more conveniently. When the next socket 96 or 98 is reached in the course of the jaw rotation, the spring loaded pin 90 snaps into the next socket to retain the jaw in the desired operating position. If both jaws are provided with locking means the described step is repeated for the second jaw.

Occasionally it may be desirable to raise or lower the carriage 42 to facilitate the servicing of the wheel; if so, the hydraulic cylinder 56 may be actuated to raise the carriage further or alternatively, the release valve 66 may be actuated to lower the carriage to a more convenient height.

Accordingly, the invention is extremely useful to remove, handle, manipulate and replace a wheel or wheels on a vehicle for servicing without an operator being required to lift or forcibly manipulate the wheel. The apparatus can be used with any type of vehicle wheel which would be difficult or cumbersome to handle or manipulate manually and permits a single operator to safely perform the work functions previously requiring a multi-man labor gang and accordingly results in greater work efficiency and economy.

While the preferred embodiments of the invention have been described, it should be understood that various changes, adaptations and modifications may be made therein without departing from the spirit of the invention and the scope of the appended claims.

What is claimed is:

1. A wheel handling apparatus for holding a vehicle wheel during servicing comprising:
   a frame including a carriage slidably mounted for vertical movement on said frame;
   vehicle wheel engaging means to selectively engage the vehicle wheel including a pair of arms carried by said carriage and swingably mounted relative to one another and vehicle wheel engaging members pivotally mounted to said arms to pivot about a horizontal axis;
   means for tightening said vehicle wheel engaging means on the vehicle wheel to securely hold the vehicle wheel in said vehicle wheel engaging means during servicing;
   a wheel removing mechanism mounted to said carriage and confronting the wheel to force a hard-to-remove wheel from the vehicle; and
   said carriage including a socket means confronting the wheel for receiving and removably mounting said wheel removing mechanism so that said mechanism may be selectively removed from the carriage so the wheel may be rotated about said horizontal axis with said pivotally mounted members.

2. The invention according to claim 1 wherein one of said arms is fixed to said frame.

3. The invention according to claim 1 wherein said frame includes:
   a generally upright post;
   a carriage slideably mounted on said post for vertical movement and carrying said vehicle wheel engaging means; and
   rollers positioned at upper and lower ends of said carriage and bearing against said post to assure smooth sliding vertical movement of said carriage relative to said post under heavy loading of the carriage.

4. The wheel handling apparatus of claim 1 wherein:
   said frame includes a generally upright post and a carriage slidably mounted on said post for vertical movement and carrying said vehicle wheel engaging means, said carriage having a mounting bracket extending over the top of said post; and
   an hydraulic cylinder positioned between the top of said post and said mounting bracket for selectively slidably moving said carriage along said post.

5. The wheel handling apparatus of claim 1 wherein each of said pivotally mounted wheel engaging members includes a jaw pivotally mounted to one of said arms to permit a vehicle wheel held between said jaws to be rotated about a horizontal axis to facilitate access to the wheel for servicing, each of said jaws including a pair of confining barriers arranged to lie on either side of the wheel to prevent movement of said wheel along the wheel axis to prevent escape of the wheel from said jaws.

6. A wheel handling apparatus for holding a vehicle wheel during servicing comprising:
   a frame;
   vehicle wheel engaging means to selectively engage the vehicle wheel including a pair of arms carried by said frame and swingably mounted relative to one another and vehicle wheel engaging members carried by said arms; and
   means for tightening said vehicle wheel engaging means on the vehicle wheel to securely hold the vehicle wheel in said vehicle wheel engaging means during servicing; and
   each of said wheel engaging members including a jaw pivotally mounted to one of said arms to permit a vehicle wheel held between said jaws to be rotated about a horizontal axis to facilitate access to the wheel for servicing, at least one of said arms and pivotally mounted jaws having locking means to prevent undesired rotation of said jaw relative to its arm during servicing.

7. The wheel handling apparatus of claim 6 wherein said locking means includes a spring-loaded locking pin movably mounted to one of said arms for movement toward and away from the jaw pivotally mounted to the arm, said jaw having a plurality of pin sockets positioned to receive said locking pin, said pin sockets positioned at equal radial distances from the horizontal axis of rotation of the jaw and at predetermined angular displacements about said axis, said spring-loaded pin being biased to urge said pin toward a pin socket to thereby lock the jaw in fixed position relative to said arm.

8. The wheel handling apparatus of claim 6 and further including:
- a generally upright post;
- a carriage slidably mounted on said post for vertical movement and carrying said vehicle wheel engaging means; and
- a wheel removing mechanism releasably mounted to said carriage and confronting the wheel to force a hard-to-remove wheel from the vehicle.

9. The wheel handling apparatus of claim 8 wherein said carriage includes a socket for said wheel removing mechanism confronting the wheel, said wheel removing mechanism being releasably mounted in said socket for said wheel removing mechanism.

10. The wheel handling apparatus of claim 6 wherein each said jaw includes a pair of confining barriers arranged to lie on either side of the wheel to prevent its escaping said jaws during rotation of said pivotally mounted jaws.

* * * * *